United States Patent [19]

Planzo

[11] 4,354,260

[45] Oct. 12, 1982

[54] PERSONAL DATA BANK SYSTEM

[76] Inventor: Carmine S. Planzo, 15 Av. Eugene Pittard, 1206 Geneve, Switzerland

[21] Appl. No.: 182,023

[22] Filed: Aug. 28, 1980

Related U.S. Application Data

[63] Continuation-in-part of Ser. No. 31,408, Jul. 27, 1979, abandoned.

[51] Int. Cl.³ .................. G04B 47/00; G04B 23/02; G09F 9/30
[52] U.S. Cl. ........................... 368/10; 368/43; 368/74; 368/82; 368/187; 340/706; 340/802; 364/709
[58] Field of Search ............ 368/62, 10, 82–84, 368/155, 156, 28–30, 41–44, 185–188, 223, 250, 251; 340/706, 711, 802; 364/705, 709, 710, 900 MS

[56] References Cited

U.S. PATENT DOCUMENTS

| | | | |
|---|---|---|---|
| 4,026,101 | 5/1977 | Moter | 368/82 |
| 4,083,175 | 4/1978 | Petropoulos et al. | 368/29 |
| 4,142,361 | 3/1979 | Kimura | 368/69 |
| 4,178,750 | 12/1979 | Murakam et al. | 368/251 |
| 4,267,589 | 5/1981 | Yamaguchi | 368/109 |
| 4,293,855 | 10/1981 | Perkins | 340/802 |
| 4,303,946 | 12/1981 | Schmitz | 368/82 |

*Primary Examiner*—Vit W. Miska
*Attorney, Agent, or Firm*—Hedman, Casella, Gibson & Costigan

[57] ABSTRACT

A personal data bank system is disclosed for use in combination with a digital watch. The personal data bank system is capable of generating, storing and recalling alphanumeric data using a minimum number of switches. The system includes a set control logic circuit capable of generating a sequence of alphanumeric characters which are displayed on the watch. Upon repeated actuations of a single switch, a desired array of characters are selected and thereafter are stored in a memory. Recalling the information is accomplished by either an alphabetic search or by a unique code number system wherein a code number is assigned to each data set. The sequence of characters is generated by the set control logic circuit which includes a blank character to facilitate the programming of the memory.

14 Claims, 21 Drawing Figures

PERSONAL DATA BANK SYSTEM

This application is a continuation-in-part of Ser. No. 31,408, filed July 27, 1979, now abandoned.

BACKGROUND OF THE INVENTION

The subject invention relates to a personal data bank system capable of generating, storing and recalling data in the form of an array of alphanumeric characters, which is intended to be used in combination with a digital watch.

In the prior art, many digital watches have been developed which contain a crystal oscillator and integrated circuits capable of electronically monitoring and displaying time. As the technological sophistication of the industry increases, allowing highly complex circuits to be sufficiently miniaturized to fit within the casing of the watch, many watches are now being manufactured having multiple capabilities. More specifically, digital watches have been developed that include chronograph or stop watch functions, in addition to various alarm functions. The prior art also includes watches provided with a calculator function wherein a dozen or more switches are mounted on the watch casing to enable the input of numerical data.

Based on the latter prior art, a digital watch could be developed which is capable of displaying, storing and recalling alphanumeric information. However, as with watches having calculator type functions, in order to be able to input a full range of alphanumeric characters it would be necessary to provide an entire set of alphanumeric keyboard switches. As noted above, while the level of sophistication in the industry has permitted the miniturization of highly complex circuitry, the necessity of providing a large number of external switches renders the production of an alphanumeric data bank system impractical. More specifically, external switches, in order to have the necessary reliability are generally reed switches which are relatively expensive and require the user to have a permanent magnet within the watch. In the alternative, push pin type switches are utilized which engage a contact within the watch case. The openings in the watch casing, necessary for the latter type switches are difficult to waterproof. Thus, while known circuitry for a personalized data system could be readily installed within a watch casing, the requirements of providing a great number of switches prevented such a system from being manufactured.

Accordingly, it is an object of the subject invention to provide a new and improved personal data bank system capable of generating, storing and recalling data in the form of alphanumeric characters which requires a relatively few external switches.

It is another object of the subject invention to provide a new and improved personal data bank system which may be combined with a multi-function digital watch wherein the combination requires relatively few external switches.

It is a further object of the subject invention to provide a personal data bank system including a unique set control logic circuit which functions to generate a series of data signals corresponding to alphanumeric characters and further includes a data signal corresponding to a blank or null character thereby facilitating the programming of the data bank.

It is still another object of the subject invention to provide a new and improved personal data bank system wherein the functions thereof may be combined with the functions of the associated digital watch whereby user programmed data can be recalled in response to the actuation of an alarm circuit in the watch.

It is still a further object of the subject invention to provide a personal data bank system having a unique recall method wherein code numbers are associated with each data set and wherein a specific data set can be recalled via these code numbers.

It is still another object of the subject invention to provide a personal data bank system which includes a second recall function wherein a portion of the data set is alphabetically scanned and displayed enabling the user to find and recall the entire data set.

SUMMARY OF THE INVENTION

In accordance with these and many other objects, the subject invention provides for a personal data bank system capable of generating, storing and recalling data which is intended to be used in combination with a digital watch. In a preferred embodiment of the subject invention, a plurality of independent circuits are provided within the watch, each circuit corresponding to a different mode or function thereof. A mode control logic circuit is provided to select the circuit path corresponding to the particular function chosen by the user. In a preferred embodiment, functions include normal time keeping, chronograph, time zone settings, and alarm settings. The personal data bank system of the subject invention is an additional function which may be selected via the mode control logic circuit. In accordance with a preferred embodiment of the subject invention, one of the alarm functions is operatively connected to the storage of the data bank system such that a desired data set may be recalled in response to the activation of an alarm.

The subject personal data bank system includes a set control logic circuit to facilitate the programming of the data. More specifically, the set control logic circuit is capable of generating a fixed sequence of either numerical or alphanumerical data which is displayed on a first position of the watch display. The watch display has a plurality of distinct positions. The desired character is selected by actuating a switch when the desired character is displayed on the watch. In accordance with the subject invention, the actuation of the switch to select or block the desired character also functions to cause the sequence of characters to be displayed in a second position on the watch display, enabling a second character to be selected. In like manner, repeated actuation of the switch results in a desired array of characters being selected and retained in the remaining positions of the display array. The initial signal generated by the set control logic corresponds to a blank or null character such that if the desired set of characters contains less than the total number of display positions, the null character is immediately selected by the user, thereby speeding the programming of the information. In a preferred embodiment of the subject invention, the display means and memory are arranged in two rows or sets each having an eight character capability. The first array is intended to display and store numerical characters, while the second array is intended to display and store six alphanumerical characters and two numerical characters, the latter numerical characters corresponding to a unique code number system. The first array of numerical information may be utilized to hold for example phone numbers. The first six characters in the second row may be used to store a set of alphanumeric characters such as a name which is associated with the numbers in the first array. The last two digits of the second row correspond to a code number which is uniquely associated with each individual data set. The data bank logic circuit functions to numerically address each data set with an incremental code number corresponding to that set. Applicant's unique arrangement of coded information permits recall of a desired data set in a new and improved manner. More specifically, in a first recall mode, information is recalled using the associated code number. In the alternative, an alphabetical recall system may be utilized, wherein a search of the alphanumeric portion of each data set in memory is made. The alphanumeric portions are then displayed in alphabetical order enabling the user to find and recall the desired data set.

As will be appreciated from the following detailed description, the subject invention enables the user to program store and recall alphanumeric data using a relatively small number of switches, thereby minimizing the cost of manufacture of the system. Many other objects and advantages of the subject invention will become apparent from the following detailed description when taken in conjunction with the drawings in which:

DETAILED DESCRIPTION OF THE PREFERRED EMBODIMENT

Figure 1:
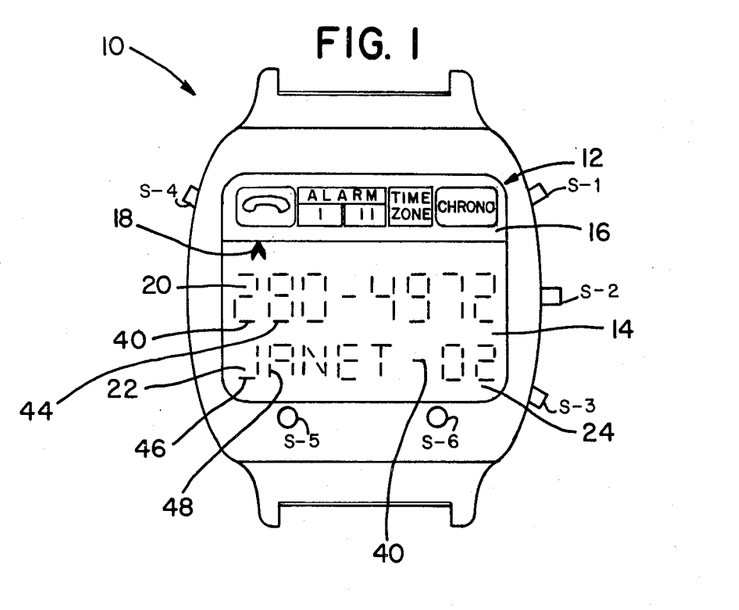
FIG. 1 is a top plan view of a typical solid state watch incorporating the personal data bank system of the subject invention.

Referring to FIG. 1, there is illustrated a digital electronic watch 10 having an upper face 12 which includes a digital display area 14 and a mode selection area 16. The mode selection area 16 includes indicia corresponding to the various functions of the watch, and an electronic flag 18, in the shape of the arrow, indicating which functional mode has been selected. In the preferred embodiment of the subject invention, the digital display area 14, which may be provided with for example, LCD or LED elements, includes upper and lower display arrays 20, 22 respectively. Upper array 20 is capable of displaying eight numeric characters, while lower display 22 is capable of displaying eight alphanumeric characters. When the watch 10 is in the data bank system mode, as shown in FIG. 1, the last two digits 24 of the lower display 22 are numeric and correspond to the code number as more fully described hereinafter. Six switches S1-S6 are provided on the watch for mode selection and programming.

Figure 3:
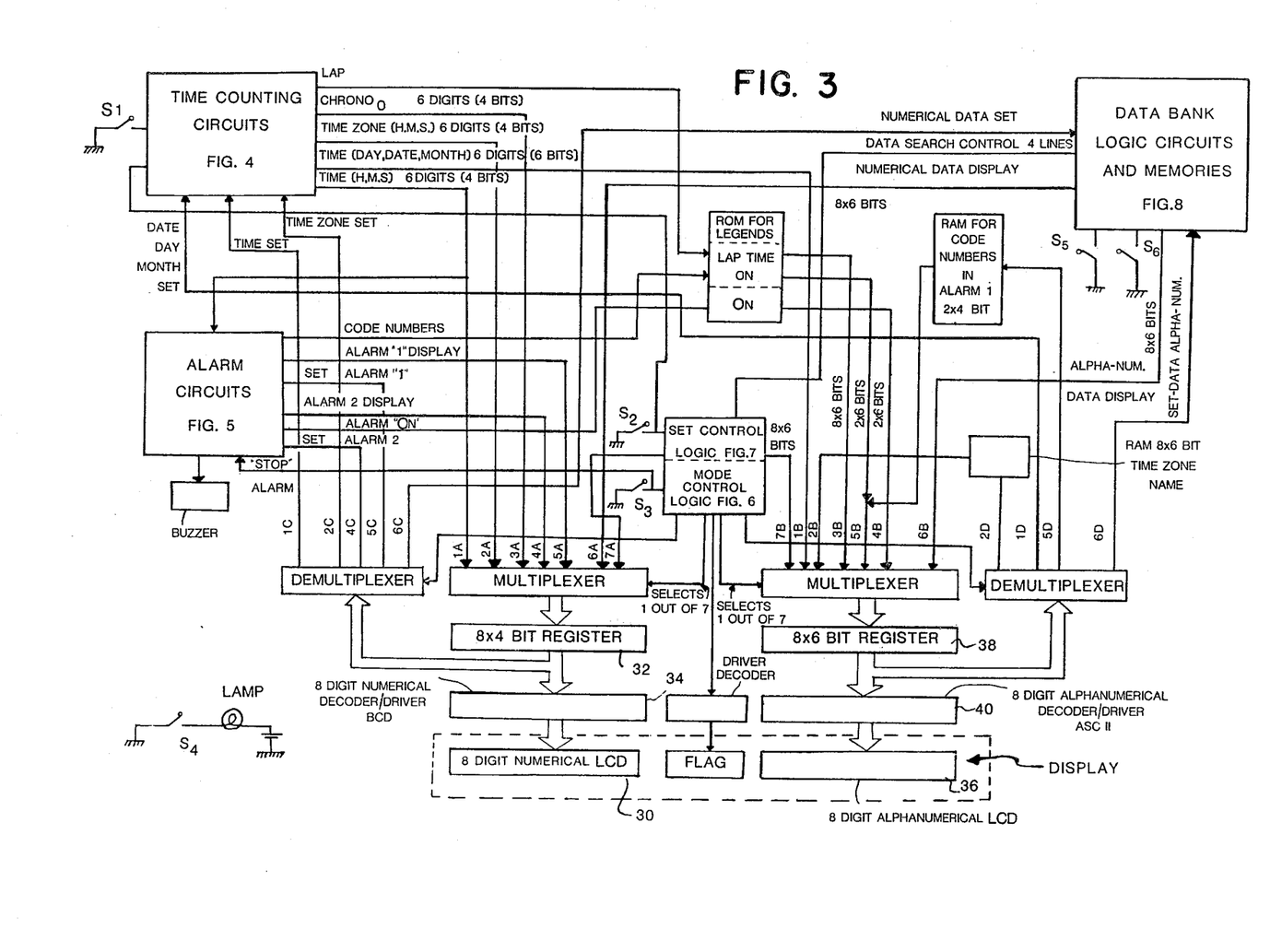
FIG. 3 is an overall block diagram of the circuitry which comprises the personal data bank system of the subject invention in combination with the circuitry of a multi-function digital watch.

As noted above, the subject invention relates to a data bank system capable of generating, storing and recalling alphanumerical data. The design of the subject invention enables this information to be programmed and recalled using a relatively few number of switches. While particular circuitry for carrying out the subject invention is illustrated, it is to be understood that the scope of the subject invention is not intended to be limited thereby. In addition, much of the circuitry illustrated in the accompanying block diagrams and particularly the time related functions are well known in the art. However, the overall block diagram of FIG. 3 is intended to disclose the unique combination and cooperation between the personal data bank system and a multi-function digital watch. Thus, while the circuitry for the watch type functions is well known, the cooperation between the watch and the data bank system is also considered novel, as for example in the alarm I mode wherein information from the storage memory is accessed in response to the alarm.

As noted above, the unique personal data bank system is preferably incorporated in a multi-function digital watch. Each function, including the data bank system, has a particular set of circuitry associated specifically therewith. Accordingly, a means must be provided to facilitate the selection of the desired circuitry. As illustrated in FIG. 3, a mode control logic circuit is provided for selecting the particular set of circuits corresponding to the desired function. As illustrated in FIG. 3, the major input and output lines are designated with numerals from 1-7 and letters from A-D, with the numerals indicating the type of function and the letters indicating the type of information carried and in what direction. Each line is connected to a multiplexer or demultiplexer enabling the mode control logic to select one set of lines. For example, lines having the numeral 1 correspond to the real time function and lines with the numeral 2 correspond to the time zone function. Lines 7A and 7B carry output from the set control logic and are utilized in any function which requires the watch to be set. The letters associated with each line are defined as follows: A lines carry numerical output data; B lines carry alphanumeric output data; C lines carry numeric input data; and D lines carry alphanumeric input data. The lines 6A, 6B, 6C, and 6D correspond to the subject data bank system, and will be described immediately hereinbelow. It is to be noted that if the subject data bank system were used independently of a digital watch, it would be unnecessary to provide mode control logic circuitry for selecting this function. Therefore, for the initial portion of the following description, it will be assumed that the proper connections for the data bank circuitry (lines 6A, 6B, 6C, 6D, 7A, 7B) have been made.

The personal data bank system of the subject invention is capable of programming, storing and recalling information of the type illustrated in FIG. 1. More specifically, an eight digit numerical upper display array 20 is intended to store for example, phone numbers. As illustrated in FIG. 3, the eight digit numerical display is shown at 30 and is interfaced to an eight by four bit register 32 through a binary coded decimal decoder/driver 34. As is well known in the art, a BCD decoder/driver is capable of converting binary data to numerical data and vice versa. The lower display array 22 of the LCD read out is capable of displaying a full range of alphanumeric data. As illustrated in FIG. 3 at 36, the lower display is interfaced to an eight by six bit binary register 38 through a conventional ASC11 decoder/driver 40.

Figure 7:
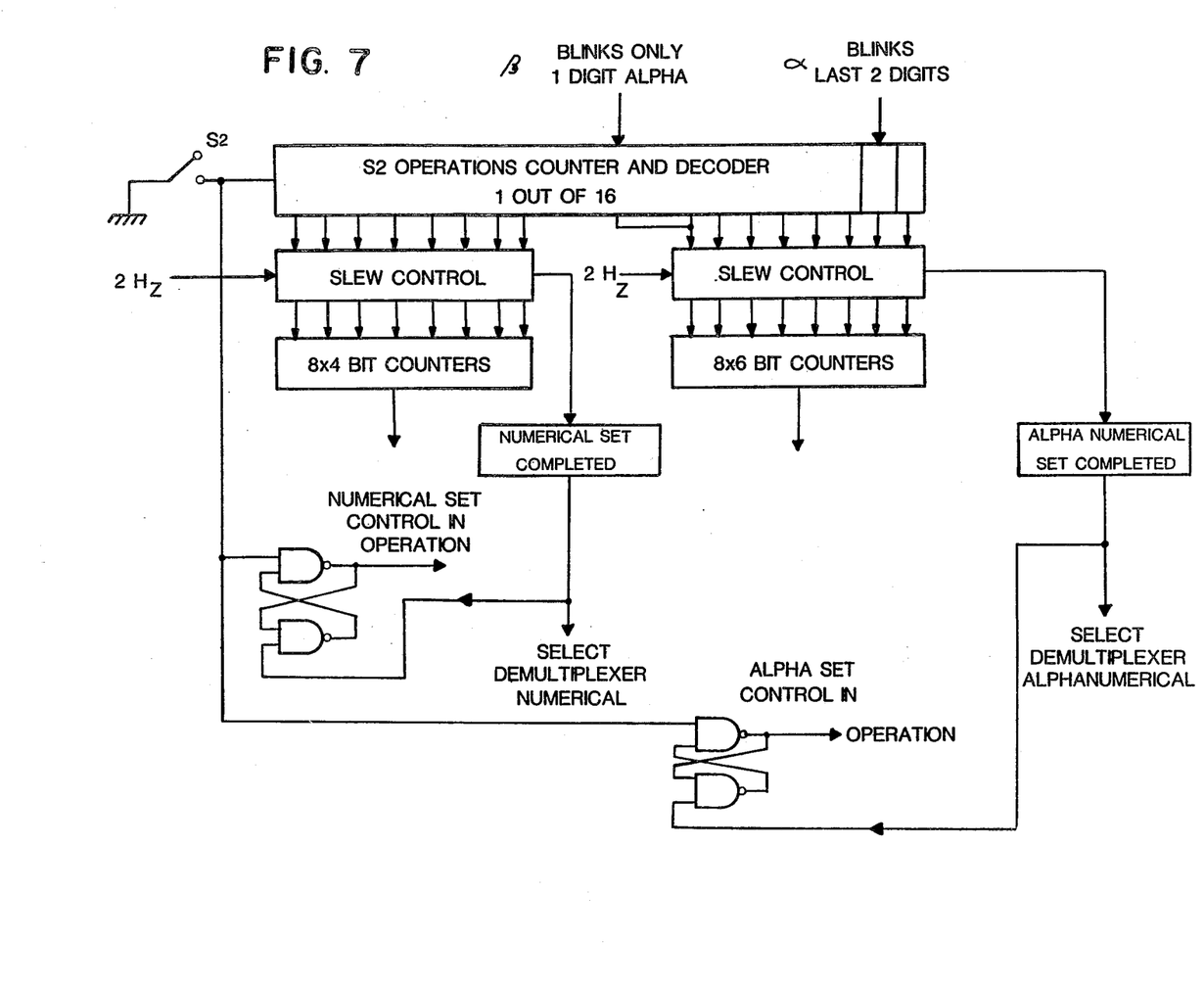
FIG. 7 is a block diagram of the set control logic circuit of the subject invention.

When a user wants to program personal data into the memory of the system, the operation is initiated by pressing switch S2 thereby activating the set control logic circuit. The set control logic circuit, illustrated in FIG. 7, is designed to generate a fixed sequence of data signals corresponding to numeric or alphanumeric characters. The initial data signals are gated via line 7A, through the eight by four bit register 32 into the eight digit numerical LCD 30. Preferably, the sequence which is generated in this numeric section begins with a blank or null character (as illustrated at 40 in FIG. 1) and then progresses through the digits 1, 2, 3, . . . 0, and back again to the null character. In accordance with the subject invention, the character sequence is displayed in the first digit 42 of the upper area 20. The continuous display of the character sequence will proceed until switch S2 is pressed again. The repressing of the switch S2 causes two results. First, the most recently displayed numeric character of the sequence is fixed or blocked in the first position 42 of the array. Secondly, the data signals generated by the set control logic are gated to the second position 44 of the display. Thus, if the user intends to program the digit "2" into the watch, he activates the set control logic by pressing switch S2 and waits for the digit "2" to appear on the display. By pressing switch S2 the digit "2" is fixed in the first position and the sequencing of the second position 44 will begin. Subsequent pressings of switch S2 will result in a character being blocked into each position of the upper array 20, to produce, for example, the telephone number illustrated in FIG. 1. Preferably, the sequencing of the characters in the set is carried out at 2 cycles per second.

Immediately upon completion of the numerical set and its temporary storage in the eight by four bit register 32, the set control logic circuit will automatically begin generating a sequence of data signals corresponding to alphanumerical characters in order to program the lower display 22. As noted above, six alphanumerical positions are available with the remaining two digits 24 being reserved for the code number information, as more fully described immediately hereinbelow. The alphanumeric set generated by the set control logic begins the the same way as the numerical set, with the blank or null character, followed by the numerical set 1, 2, 3 . . . 0. Thereafter, a full alphabetic character set, A-Z, is generated. The lower array is similarly programmed by repeatedly pressing switch S2 to fix each digit. More specifically, and as illustrated in the example in FIG. 1, when the first position 46 displays the letter "J," switch S2 is pressed which blocks the letter. The pressing of switch S2 simultaneously causes the alphanumeric sequence to be gated to the second position 48. The subsequent repressing of switch S2 will result in the programming of the six positions in the lower array 20, as illustrated in FIG. 1. It is noted that in the example only five positions are needed for alphabetic data and the null character is placed in the sixth position. Since the first character generated by the set control logic is the null character unused positions may be rapidly filled such that programming time is minimized.

The final two digits 24 correspond to the code number associated with the selected information set. In accordance with the subject invention, when the memory is blank, during the input of the first data set, the code number is also programmed by the user in a manner similar to the programming of the numerics of the upper display 20. Upon subsequent data input, the data bank logic circuit automatically provides the next available code number. The code number ranges from 0-99, and in FIG. 1 for example, "02" was selected. As with the numerical data, the first digit of the code number will cycle from 1 to 0 until switch S2 is pressed blocking the "0" in the first digit. At the same time, the second digit will blink until switch S2 is pressed again blocking the number "2." When the next data set is programmed the data bank logic circuitry will increment the highest code number in memory by one and automatically assign it to the data set. As illustrated in FIG. 1 all of the sixteen possible positions have been programmed and are ready to be stored in the memory.

Figure 8:
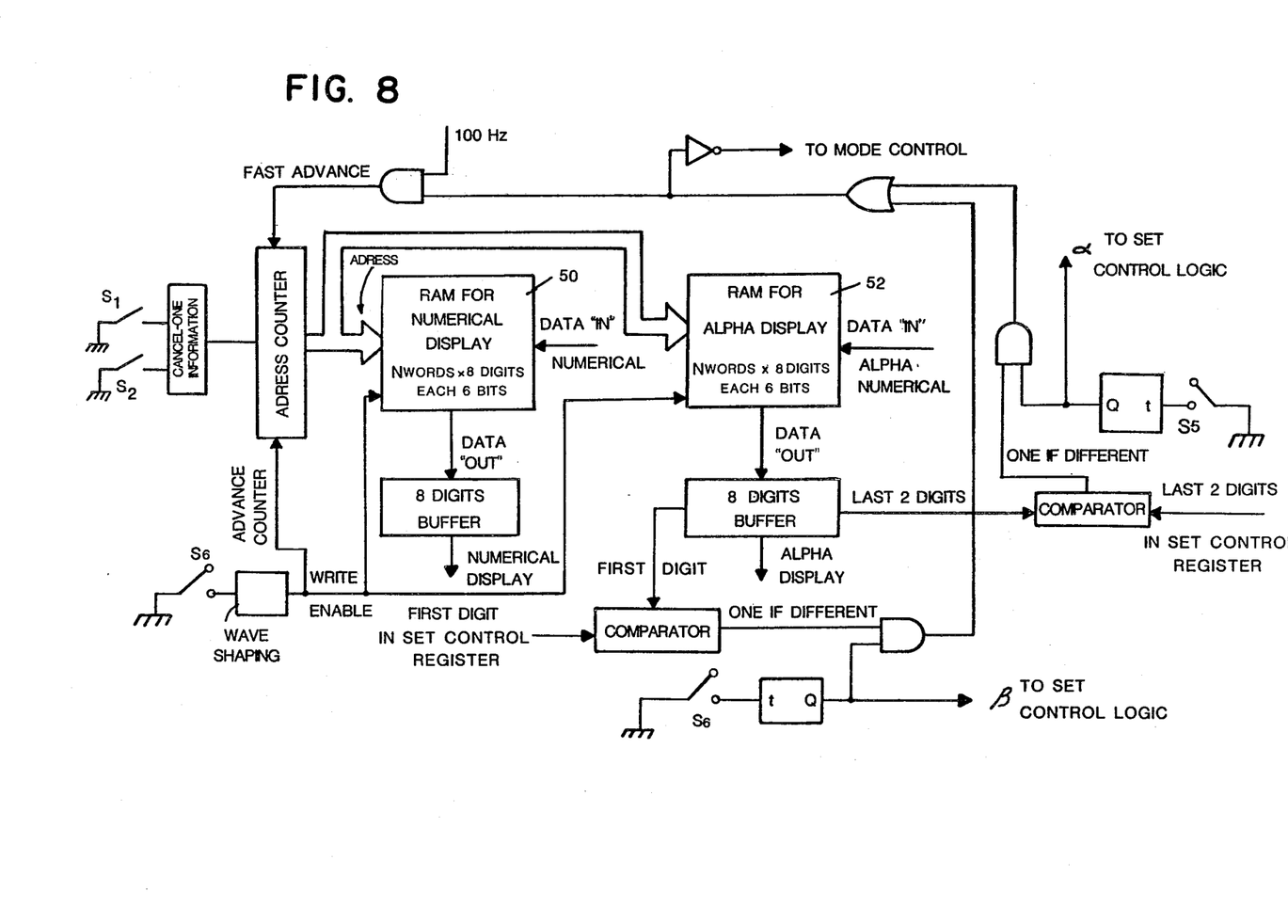
FIG. 8 is a block diagram of the data bank logic circuit and memories of the subject invention.

Referring to FIG. 8, illustrating the data bank logic circuits and memory, by pressing switch S6, the information temporarily stored in the registers 32, 38 is transferred to the respective random access memories (RAM) 50 and 52. The path of this data, as illustrated in FIG. 3, is along input lines 6C and 6D, respectively. The numerical data held in the eight by four bit register 32 is stored in RAM 50 which can hold N words, each having eight digits. The numerical digits are alotted four bits each. The alphanumerical information contained in the eight by six bit register 38 is stored in RAM 52 which can hold N words each having eight digits. Each alphanumeric character is alotted six bits. Preferably each random access memory is capable of holding approximately one hundred words corresponding to the total number of code numbers. However, it is to be understood that the number of words and the amount of code numbers may be varied within the scope of the subject invention.

After the first set of character information has been stored in the memories, the sequence may be started again simply by pressing the switch S2 which will cause the first position 40 to begin displaying the character sequence generated by the set control logic. As noted above, after programming the first set of data, the code number is automatically incremented and displayed at 24. A plurality of data sets may be defined and stored in this manner using only two switches.

Figure 9:
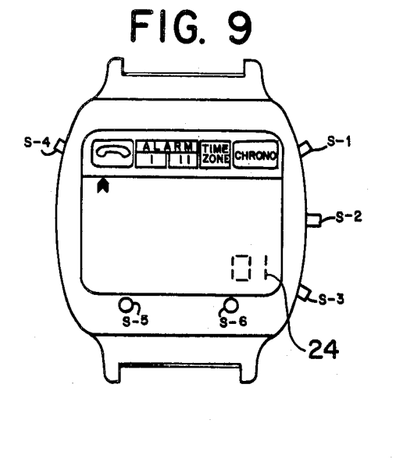
FIGS. 9-21 illustrate various displays associated with the different functions of the watch, with FIGS. 9-10 illustrating the data bank recall mode, FIGS. 11-12 illustrating the real time mode, FIGS. 13-16 illustrating the chronograph mode, FIG. 16 illustrating the time zone mode, and FIGS. 17-21 illustrating the alarm modes.

The subject invention provides for two methods for recalling the information stored in the memories. The first recall method is related to the code number system, wherein the user merely has to ask for a read out of the information associated with a particular code number. More specifically, in operation, switch S5 is pressed which results in the LCD field being blanked out except for the code number information at 24, as illustrated in FIG. 9. The information is gated to the display from the data bank memory via line 6B of FIG. 3. The code number displayed is the lowest code number which is in the memory bank. Upon pressing switch S2, the code number will increase by increments of one every second. When the display reaches the desired code number, the switch S1 is pressed which causes the data set associated with that code number in the memory, to be gated through lines 6A and 6B into the respective registers 32 and 38 and displayed on the upper and lower arrays 20, 22. If the user wishes to display additional data, switch S2 is repressed, causing the code number to begin incrementing again until switch S1 is pushed, thereby retrieving the information from the memory with the most recently displayed code number.

Figure 10:
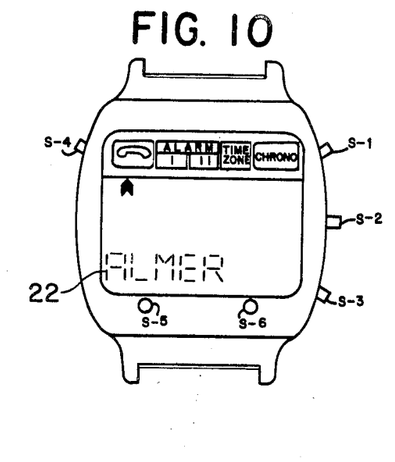

The second type recall method is an alphabetical process which searches the alphanumerical position of each character set in the memory, and displays that portion in alphabetical order. More specifically, in operation switch S6 is pressed which causes the data bank logic circuits to search through the alphanumeric portion of the data sets stored in random access memory 52 at one hundred cycles per second. The circuit will cause this portion of the character set to be displayed in the lower array 22 in alphabetical order as illustrated in FIG. 10. A new word is displayed every second. When the desired code word, for example, "JANET" is displayed, the user presses S1 to retrieve the entire data set associated with the word JANET. If the user wishes to continue the search, the S6 switch is repressed causing the cycle to continue.

If the user wishes to cancel and reprogram information associated with any code number, the information is first retrieved by either recall method described above. Once the information is retrieved and displayed, the user presses switches S1 and S2 simultaneously which will cancel the numerical and alphanumerical data, leaving the code number in place, as illustrated in FIG. 9. New data is reprogrammed in a manner identical to the manner described above and more specifically, by pressing switch S2 to initiate the sequencing of the first digit 42 of the display.

The above described circuitry discloses the design and function of the new and improved personal data bank system of the subject invention. The remaining description and figures relate to the combination of the personal data bank system with a conventional digital watch. The unique combination between the data bank system of the subject invention and a multi-function digital watch achieves advantages from the cooperation therebetween. For example and as discussed more fully hereinbelow, a conventional alarm can be connected with the data bank system such that at the sounding of an alarm, a data set is withdrawn from the memory bank and displayed as a reminder to the user.

Figure 2:
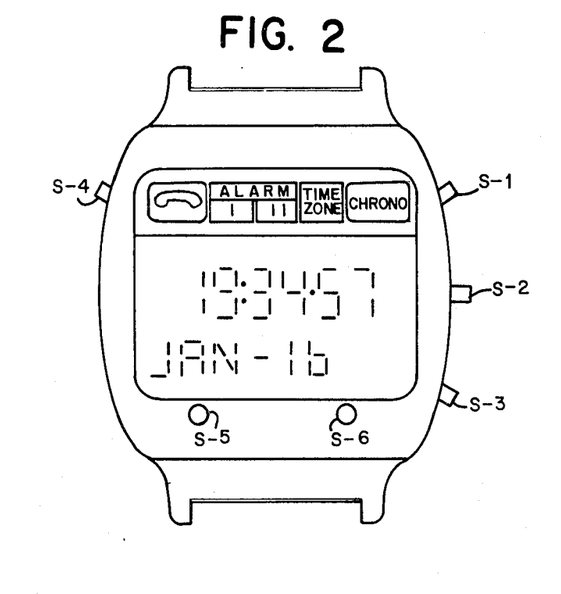
FIG. 2 is a top plan view of a watch similar to FIG. 1 showing the display in the time mode.
Figure 4:
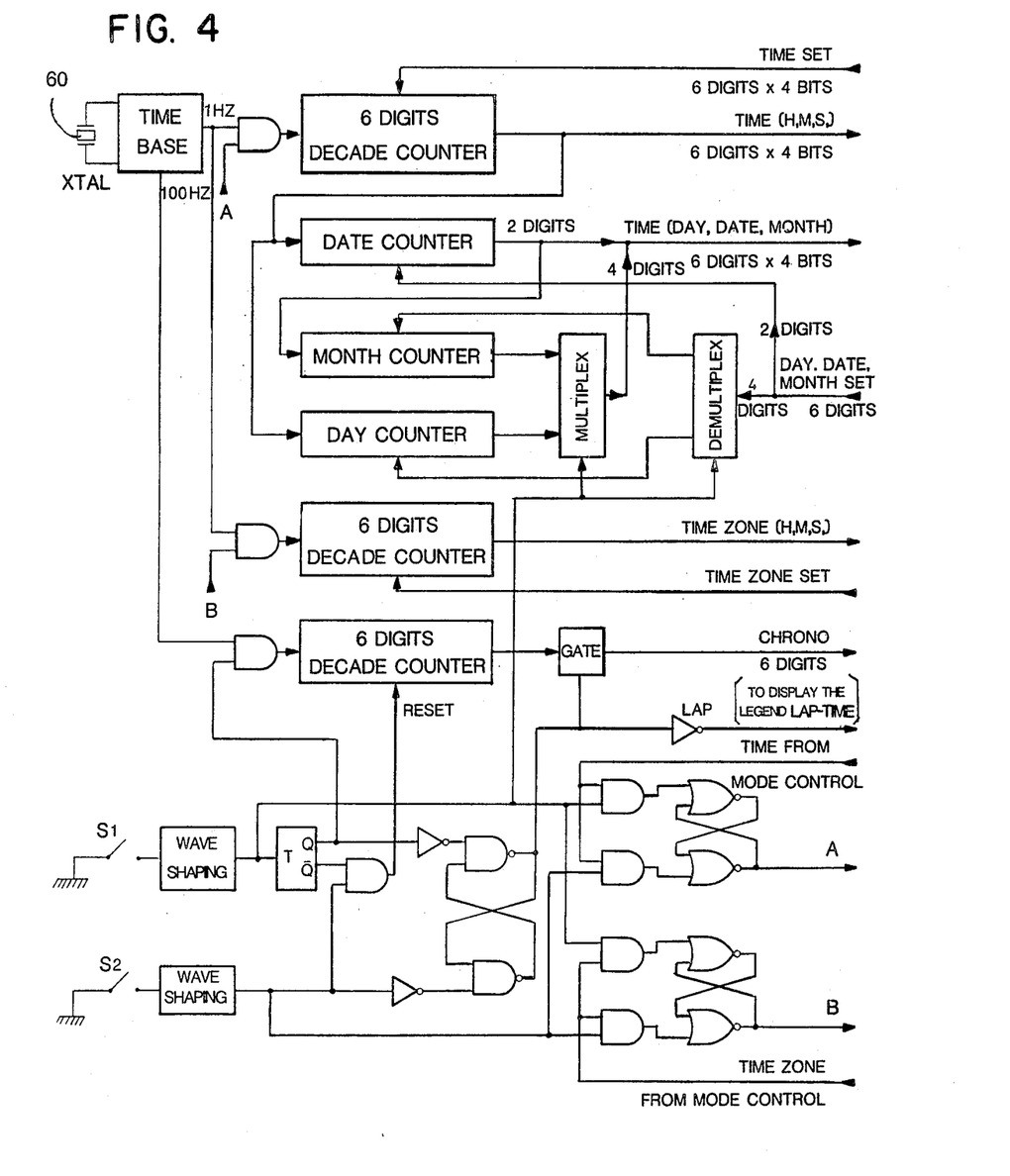
FIG. 4 is a block diagram of the time counting circuits of the subject invention.
Figure 11:
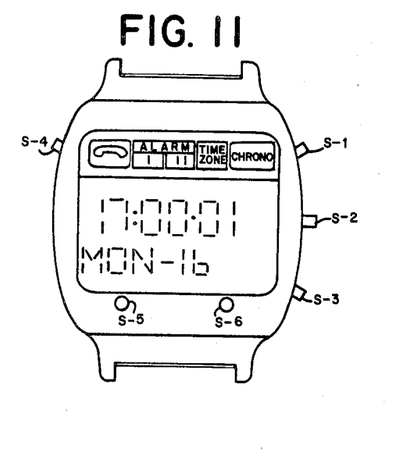

The preferred embodiment of the multi function digital watch of the subject invention includes a real time mode, a chronograph mode, a time zone mode and two alarm modes. In order to be able to access the circuitry for each mode, a mode control logic circuit is provided that is essentially a switching device which works through the multiplexers to define the necessary electrical paths for a selected mode. The mode control logic circuit is controlled by switch S3 and is of the straight sequence type. More particularly, by pressing switch S3 the mode will be shifted from the real time mode through the remaining modes in the order illustrated in FIG. 1 from the right to left. The user is alerted to the particular mode in use by the presence of flag 18 which will light up under the mode then in use. As illustrated in FIG. 1, the flag 18 is under the phone symbol which is used to designate the personal data bank mode. The signals generating flag 18 are emitted from the mode control logic through a driver/decoder and into the display as illustrated in FIG. 3. Assuming initially the watch is in the real time mode, no flag will appear and the mode control logic will have selected lines 1A 1B, 1C and 1D, as illustrated in FIG. 3. In this mode, time, month, and day data from the time counting circuit, illustrated in FIG. 4 is being gated to the display through lines 1A and 1B, as illustrated in FIG. 2. By pressing the switch S1 the day of the week will be displayed as illustrated in FIG. 11.

Figure 12:
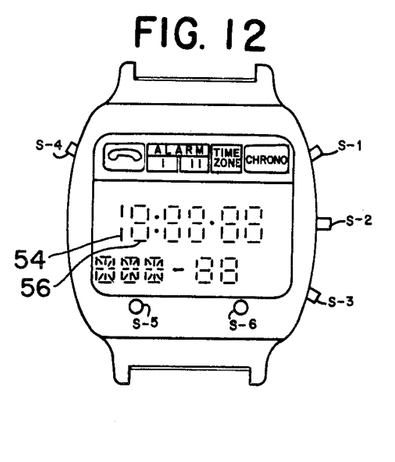

The time, day and date are initially programmed, into the time counting memories in a manner similar to the data programming. More specifically, with the watch in the real time mode, switch S2 is pressed causing the digit in the first position 54, as illustrated in FIG. 12, to sequence with numeric characters generated by the set control logic. Once the desired character is obtained switch S2 is repressed causing the digit "1" in first position 54 to be blocked, and initiating the sequencing of the second digit 56. The subsequent repressing of switch S2 functions to program the time, as well as the day of the week and the date. The month of the year is programmed in a similar manner. When all the data is programmed, the switch S1 is pressed automatically starting the time counting circuits.

The time counting circuitry, illustrated in FIG. 4, is essentially conventional and only will be referred to in brief. The time counting circuitry includes an oscillating crystal 60 which is connected to a six digit time counter whose output is gated through the date, month and day counters. The time counting circuitry also includes additional six digit counters for the time zone and the chronograph modes as described immediately hereinbelow.

Figure 13:
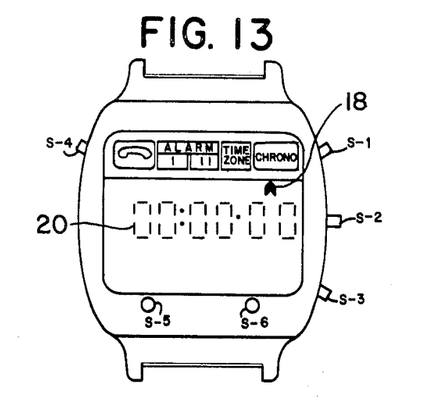
Figure 14:
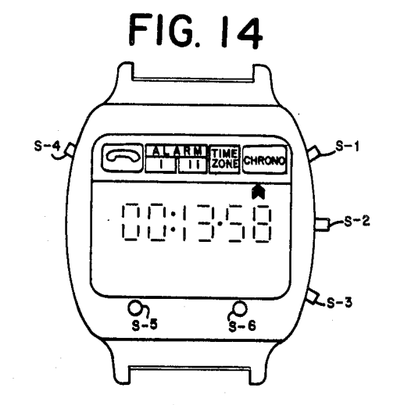
Figure 15:
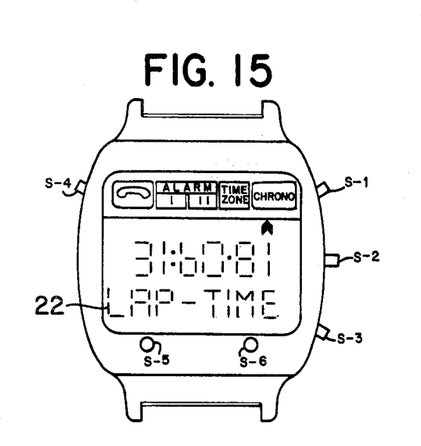
Figure 16:
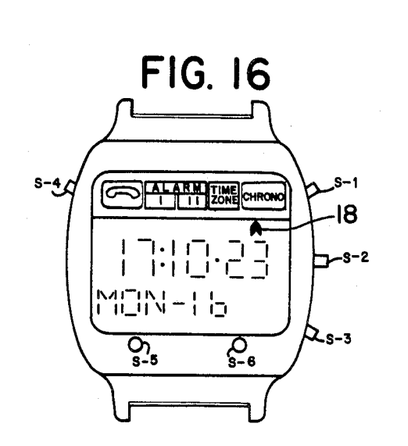

In order to convert the function of the watch into a chronograph-stop watch type function, switch S3 is pressed causing the mode control logic to select lines 3A and 3B. Since the chronograph is not programmable and needs no input, there is no need for C and D lines. As illustrated in FIG. 13, when the watch is initially set to the chronograph mode, flag 18 appears under the chronograph setting and the upper display 20 is zeroed. By pressing switch S1, the chronograph begins to count time until switch S1 is repressed stopping the watch as illustrated in FIG. 14. Timing can be alternatively resumed and halted by pressing and repressing switch S1. Another feature of the chronograph is that lap times can be obtained while the running time of the chronograph is unaffected. More particularly, by pressing switch S2 after the start of the chronograph, the elapsed time from the initial pressing of switch S1 will be displayed as illustrated in FIG. 15. The alphanumeric display of the words "lap-time" is gated to the lower display 22 via line 3B. The legend "lap-time" is stored in a read only memory (ROM) as illustrated in FIG. 3 of the block diagram. By pressing switch S1, the display will return to the continuing total elapsed time. The chronograph can be zeroed by pressing and holding the switch S2. After initially starting the chronograph, the user may then press switch S3 to return the display to real time without stopping the chronograph. As illustrated in FIG. 16, the real time will be displayed, however, the flag 18 will remain under the "chrono" designation. Thus, elapsed timing can continue while real time is being observed. To return to the elapsed chronograph time, switch S3 is pressed again.

Figure 17:
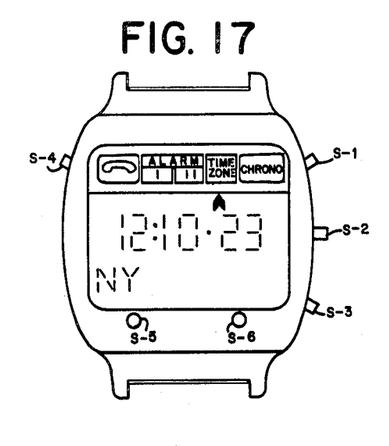

The time zone function is supplied such that the times in various cities can be programmed into the watch. Similar to the above mode selections, switch S3 is utilized to actuate the mode control logic to select lines 2A, 2B, 2C, and 2D, as illustrated in FIG. 3. The time is set in a manner identical to the real time and is stored in a memory bank provided in the time counting circuitry as illustrated in FIG. 4. Preferably, and as illustrated in FIG. 3, an eight by six random access memory (RAM) is provided for holding the names of the associated cities. The programming of the characters representing the city names are achieved in a manner identical with the alphanumeric data bank programming. Major city names could be preprogrammed in a read only memory (ROM), however, more flexibility may be obtained by allowing the user to program the cities. A typical display is illustrated in FIG. 17.

Figure 5:
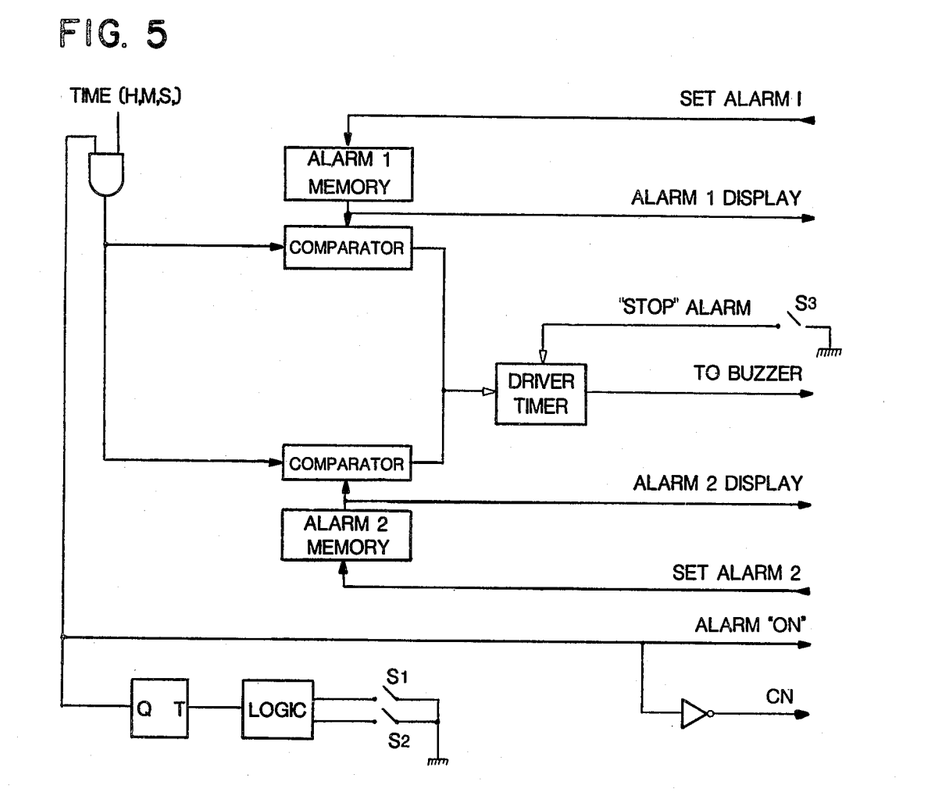
FIG. 5 is a block diagram of the alarm circuits of the subject invention.
Figure 6:
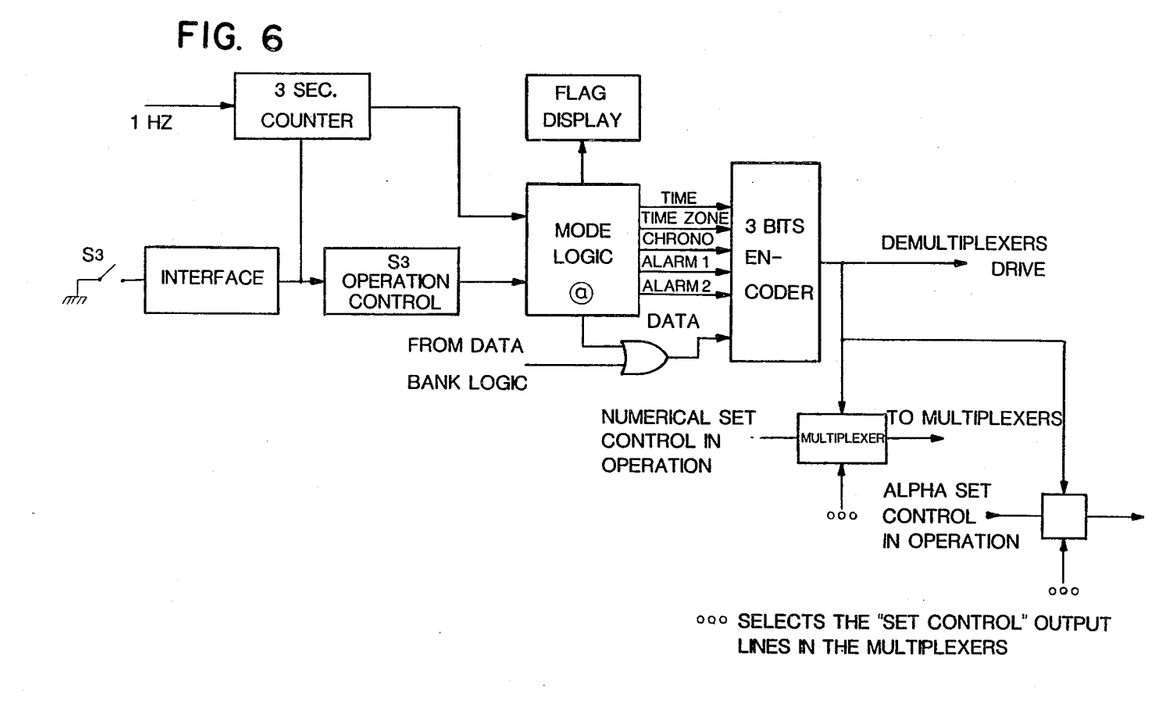
FIG. 6 is a block diagram of the mode control logic circuit of the subject invention.
Figure 18:
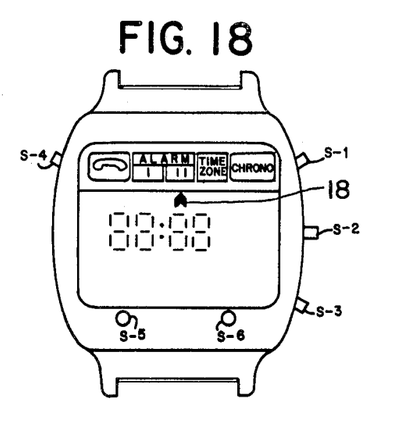
Figure 19:
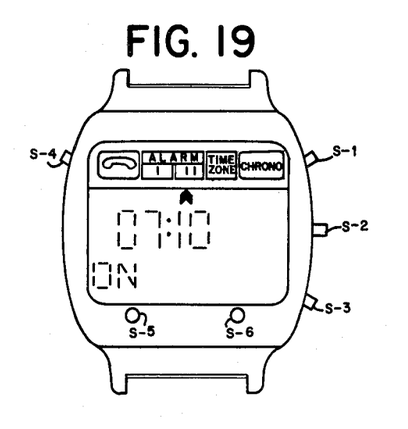

The first alarm mode or morning wake function is selected by pressing switch S3 which actuates the mode control logic to select lines 4A, 4B, and 4C. Since only numerical time data is programmed there is no need for a 4D input line. As illustrated in FIG. 18, flag 18 will appear under the designation alarm II, and four digits are made available for programming the hours and minutes of the alarm. The alarm time is set similarly to the time setting by pressing switch S2 causing the display to sequence. Subsequent actuations of switch S2 will set the hour and minutes. The alarm is set by simultaneously pressing switches S1 and S2. As illustrated in FIG. 19, the alphabetic characters "ON" are displayed. The alphabetic symbol "ON" is obtained from the read only memory (ROM) as illustrated in FIG. 3, and is gated to the display through line 4B. A conventional alarm circuit is illustrated in FIG. 5. When the time which has been set arrives, the alarm will sound. The alarm will ring for thirty seconds or can be immediately discontinued by pressing switch S3.

Figure 20:
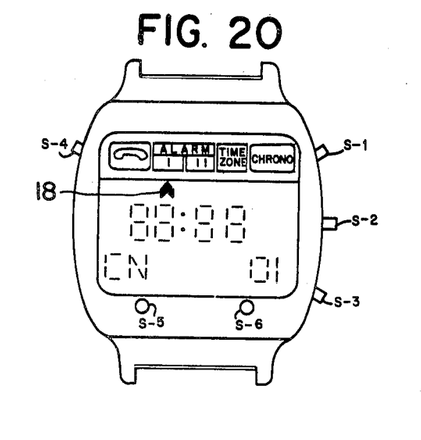

The remaining mode incorporated in the preferred embodiment of the subject invention is the alarm I function and is the only mode whose circuitry is designed to access the memories of the personal data bank system. The alarm I mode, similar to all the other modes, is actuated by pressing switch S3 such that the mode control logic circuit will select lines 5A, 5B, 5C and 5D. The watch display will appear as shown in FIG. 20 with the flag 18 under alarm I designation. A four digit time display is provided along with the characters "ON" and the lowest code number in the data bank memory. The characters "CN" are obtained from the read only memory (ROM) and are gated via line 5B to the display, as illustrated in FIG. 3.

Figure 21:
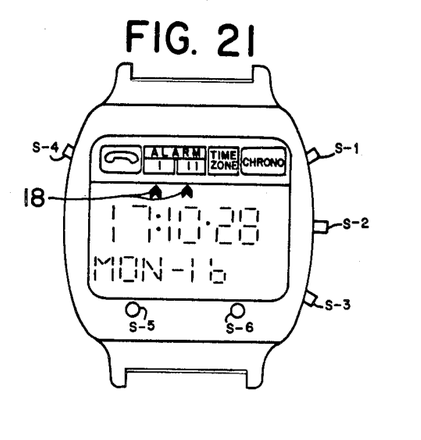

The alarm I mode is intended to sound an alarm and simultaneously display information from the data bank system. For example, if the user wishes to call Janet at 10:00, the unique alarm I circuitry permits the setting of the time and the corresponding code number such that at 10:00 the alarm will sound and the phone number and the name Janet will appear on the display reminding the user to place the call. The alarm time for the alarm I circuitry is set in a manner identical to the alarm II circuit and need not be reviewed. After the alarm time has been set, switch S2 is pressed and the lowermost code number in the data bank memory will appear. By pressing the S1 switch, the code number incrementally advances until the S2 switch is pressed. The user will select the code number corresponding to the information which he would like displayed. Similar to the setting of alarm II, alarm I is set by pressing switches S2 and S1 simultaneously whereupon the letters "CN" will disappear and the "ON" signal will appear in its place. The selected code number is stored in a two by four bit random access memory (RAM) as illustrated in FIG. 3. The alarm may be turned off by repushing switches S1 and S2 simultaneously. To return to the real time mode, switch S3 is repressed until the real time mode is obtained. As illustrated in FIG. 21 when the alarms are set, flags 18 will appear under the particular alarm designation while the watch is running in the real time mode. As noted above, when the time at which the alarm I is set arrives, the alarm will sound and the programmed information associated with the stored code number will be displayed.

It is intended that the watch of the subject invention, including the data bank system be powered by conventional batteries. By using low power integrated circuits the memory should be able to retain information for four to five years.

In summary, there is provided a new and improved personal data bank system for use in conjunction with a digital watch. The data bank system is capable of generating, storing and recalling data in the form of an array of alphanumeric characters, using a relatively few number of switches. In accordance with the subject invention, a set control logic means is provided which functions to generate a fixed sequence of data signals corresponding to alphanumeric characters. In accordance with applicant's unique programming method, a single switch is actuated causing a fixed sequence of characters to be displayed in the first position of an LCD display. Upon reactivation of same switch, the most recently displayed character is retained in the first position and simultaneously, the continuing sequence of characters is displayed in a second position of the display. Subsequent actuations of the switch results in the desired array of characters being selected and retained in the remaining positions of the array, after which the data can be stored in a memory. Retrieval of the data set is achieved by an alphabetic method or a code number method. Each data set is associated with a code number such that by designating a particular code number the data set may be retrieved. The subject invention is intended to be used in combination with a digital watch which preferably includes an alarm circuit capable of accessing the memory through the code number system. By this arrangement, when the alarm is activated, the memory is accessed and the associated information will be displayed.

While the present invention has been described in the above specification with reference to a specific embodiment, such reference has been made for purely illustrative purposes and various modifications in the details included therein may be made without departing from the scope or spirit of the invention as will be obvious to those skilled in the art.

What is claimed is:

1. An apparatus capable of generating, storing and recalling data in the form of an array of alphanumeric characters, comprising:

display means capable of displaying said data in an array of alphanumeric characters in a plurality of distinct positions;

storage means connected to said display means for storing the data therein;

first and second switch means;

set control logic means, said set control logic means being connected to said display means and said first and second switch means, said set control logic means capable of generating a fixed sequence of data signals, each data signal corresponding to an alphanumeric character, such that upon initially actuating said first switch means said set control logic means continuously generates said sequence of data signals, with the characters corresponding to said data signals being displayed in a first position of said display means, and such that upon reactuation of said first switch means (1) the most recently displayed character is retained in said first position on said display means, and (2) said sequence of characters is then displayed in a second position on said display means, and with the subsequent repeated actuation of said first switch means resulting in a desired array of characters being selected and retained in said remaining distinct positions of said display means, after which said second switch may be actuated storing said desired array in said storage means; and recall means connected to said set control logic means for retrieving said desired array from said storage means and displaying said array on said display means.

2. An apparatus as recited in claim 1 wherein said distinct positions of said display means are arranged in first and second rows each said row eight positions.

3. An apparatus as recited in claim 2 wherein the first data signal generated by said set control logic means in said sequence of fixed data signals corresponds to a blank whereby if the desired array of characters includes less than 16 characters, said first switch means may be actuated upon the initial generation of said blank by said set control means whereby the selection of said desired array is facilitated.

4. An apparatus as recited in claim 2 wherein said recall means includes a means for searching a portion of said desired array of characters stored in said storage means, said recall means being capable of displaying said portion of said desired array of characters in said display means in an alphabetical order thereby facilitating the recall of an entire specific array.

5. An apparatus as recited in claim 1 further including a code number circuit means, said code number circuit means for associating a unique code number with each array of characters stored in said storage means.

6. An apparatus as recited in claim 5 wherein said recall means uses said code number, to retrieve the associated array.

7. An apparatus as recited in claim 5 wherein said recall means includes a third and fourth switch means, such that upon actuation of said third switch means the code numbers associated with said arrays of characters are displayed on said display means whereby when the code number associated with a selected array is displayed, said fourth switch means is actuated thereby retrieving the array associated with said code number.

8. An apparatus as recited in claim 5 in combination with a watch means, said watch means capable of performing multiple functions, said combination including a mode control logic means to facilitate the selection of the function of the apparatus whereby the total number of switches are minimized.

9. An apparatus as recited in claim 8 wherein one of said functions of said watch includes an alarm means, said alarm means capable of being programmed to sound an alarm at a specified time, said alarm means capable of being further programmed with a code number associated with a specific array whereby when said alarm sounds, the array associated with said code number is recalled from said storage means and displayed on said display means.

10. A method of generating and storing data in the form of an array of alphanumeric characters comprising the steps of:

continuously generating a fixed sequence of alphanumeric characters;

displaying said fixed sequence of alphanumeric characters in a display array having a plurality of distinct positions;

fixing a desired alphanumeric character in a first position in said display array by halting the displaying of said sequence when the desired character is displayed in the first position and simultaneously starting the display of said fixed sequence of alphanumeric characters in a second position of said display means;

repeating said simultaneous fixing and starting step until desired characters are selected and retained in the remaining distinct positions of said display array; and storing said desired array in a storage means.

11. A method as recited in claim 10 further including the step of generating a null character as the first character of said continuously generated fixed sequence of alphanumeric characters.

12. A method as recited in claim 10 further including the step of searching a portion of each desired array of characters stored in the storage means, and displaying said portions in the display in alphabetical order thereby facilitating the recall of an entire specific array.

13. A method as recited in claim 10 further comprising the step of associating a unique code number with each desired array stored in the storage means.

14. A method as recited in claim 13 further including the step of recalling a desired array by regulating the code number associated therewith.

* * * * *